United States Patent [19]

Suga et al.

[11] Patent Number: 5,667,647
[45] Date of Patent: Sep. 16, 1997

[54] OXYGEN-HYDROGEN ELECTROLYTIC GAS GENERATION APPARATUS

[75] Inventors: Nagaichi Suga; Fujio Suga; Hiroshi Watanabe; Koichi Taniguchi, all of Tokyo, Japan

[73] Assignee: Suga Test Instruments Co., Ltd., Tokyo, Japan

[21] Appl. No.: 640,469

[22] Filed: May 1, 1996

[30] Foreign Application Priority Data

Nov. 27, 1995 [JP] Japan ................. 7-307627

[51] Int. Cl.$^6$ .............. C25B 9/00; C25B 13/02; C25B 11/04; C25B 15/08
[52] U.S. Cl. .............. 204/237; 204/257; 204/258; 204/263; 204/266
[58] Field of Search ................ 204/263–266, 204/255–258, 237

[56] References Cited

U.S. PATENT DOCUMENTS

| | | | |
|---|---|---|---|
| 4,029,565 | 6/1977 | Bender et al. | 204/258 |
| 4,309,264 | 1/1982 | Bender et al. | 204/256 |
| 4,744,873 | 5/1988 | Sorenson | 204/265 X |
| 4,978,438 | 12/1990 | Shimamune et al. | 204/265 |
| 5,350,496 | 9/1994 | Smith et al. | 204/265 X |

*Primary Examiner*—Donald R. Valentine
*Attorney, Agent, or Firm*—Wenderoth, Lind & Ponack

[57] ABSTRACT

An oxygen-hydrogen gas generation apparatus in which an ion exchange film is used to prevent oxygen and hydrogen from mixing. The oxygen-hydrogen gas generation apparatus includes an electrolytic cell. The electrolytic cell includes an ion exchange film interposed between box-shaped structures. The box-shaped structures each have an interior surface coated with metal, a framework for holding the ion exchange film, and a gas discharge port. Oxygen gas is generated in a chamber formed by the ion exchange film and the box-shaped structures connected to a positive pole of a power supply. A hydrogen gas is generated in a chamber formed by the ion exchange film and the box-shaped structures connected to a negative pole of the power supply.

19 Claims, 3 Drawing Sheets

5,667,647

OXYGEN-HYDROGEN ELECTROLYTIC GAS GENERATION APPARATUS

BACKGROUND OF THE INVENTION

The present invention relates to a generation apparatus for generating oxygen and hydrogen gases utilized in metal welding, processing of quartz glass and hydrogenation in various chemical reactions such as the synthesis of ammonia, methanol, and fats and oils.

In conventional apparatuses for generating oxygen and hydrogen gases by electrolysis of water, the generated oxygen and hydrogen gases are collected in a mixed state. The known apparatuses lack a convenient and simple structure which separately generates oxygen and hydrogen for individual use.

SUMMARY OF THE INVENTION

An object of the present invention is to provide a simple apparatus which is capable of generating oxygen and hydrogen gases by electrolysis. The individual gases are to be collected in order to enable the gases to be used separately. More particularly, the apparatus of the present invention provides an oxygen-hydrogen electrolytic gas generation apparatus in which an ion exchange film is used for separating the oxygen and hydrogen gases thereby preventing the gases from mixing.

A further object of the present invention is to provide an oxygen-hydrogen gas generation apparatus which can safely and individually generate oxygen and hydrogen gases by means of a simple apparatus which can be substituted for conventional gas cylinder.

A further object of the present invention is to provide an oxygen-hydrogen gas generation apparatus which is safer than the prior art because the surplus hydrogen gas is oxidized by means of a catalyst.

To achieve the above objects of the present invention, an oxygen-hydrogen electrolytic gas generation apparatus has been developed and includes an electrolytic cell having an ion exchange film interposed between box-shaped wall structures. Each of the box-shaped wall structures has an internal side coated with a metal, a framework for holding the ion exchange film, and a gas discharge port in an upper portion of the box-shaped wall structure. Also, the framework disposed in the interior of each box-shaped wall structure forms an irregular surface which is coated with a metal film. The metal coated irregular surface provides an increased surface area for each electrode.

Gas generation chambers are formed by the ion exchange film and one of the box-shaped wall structures. Oxygen gas is generated in a chamber which is connected to a positive pole of a power supply. Hydrogen gas is generated in a chamber which is connected to a negative pole of the power supply.

The oxygen-hydrogen electrolytic gas generation apparatus may include an electrolytic cell unit which may comprise a plurality of electrolytic cells connected in series. A pair of adjoining box-shaped wall structures are joined back to back to form a cell unit. The internal surfaces of the wall structures are coated with metal. The metal-coated surfaces of the box-shaped wall structures are electrically short circuited by an electrical conductor which is inserted through the back-to-back wall structures. The arrangement results in a plurality of alternately juxtaposed oxygen and hydrogen gas chambers. For example, the chamber which is located at one end of an electrolytic cell unit and connected to a positive terminal of a power supply, i.e. an oxygen chamber, is designated a starting point. Therefore, the chamber at the other end of the cell unit will be a hydrogen chamber.

Each gas chamber includes a gas discharge outlet, located in an upper portion of the associated chamber, and an electrolyte circulation port, located in a lower portion of the chamber. Both of the ports are connected with pipes and form a closed circuit which passes through an oxygen gas-liquid separation tank or a hydrogen gas-liquid separation tank and a corresponding circulation pump.

The respective gas-liquid separation tanks are each equipped with a gas discharge valve and a safety device which includes a pressure switch and a solenoid valve. When the internal pressure in a separation tank exceeds a predetermined level, the pressure switch actuates the solenoid valve which opens in order to release the over-pressure. In addition, the hydrogen gas-liquid separation tank is provided with an oxidation treatment unit which receives any untreated hydrogen gas which is discharged from the tank by means of the solenoid valve.

The power supply for the oxygen-hydrogen electrolytic gas generation apparatus of the present invention may include a solar powered generation device which includes a storage battery.

BRIEF DESCRIPTION OF THE DRAWINGS

Other features and objects of the invention will become apparent from the following detailed description of the invention, taken in conjunction with the accompanying drawings, which illustrate, by way of example, the features of the invention.

DETAILED DESCRIPTION OF THE INVENTION

Figure 1:
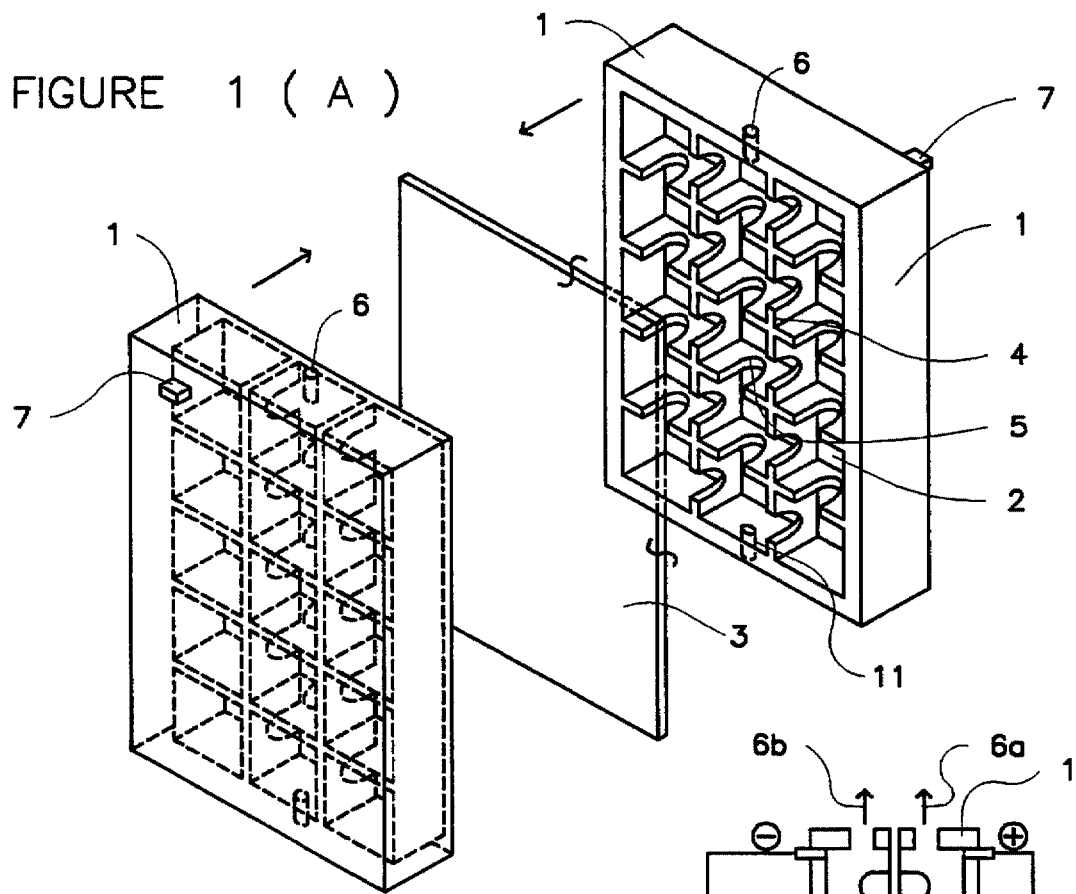
FIG. 1(a) is an exploded perspective view of an embodiment of an electrolytic cell of an oxygen-hydrogen gas generation device according to the present invention.
FIG. 1(b) is schematic view of the electrolytic cell shown FIG. 1(a) in an assembled state.
Figure 1:
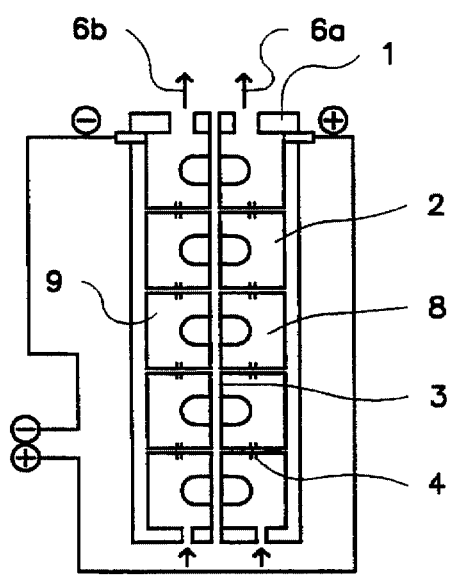

With reference to FIGS. 1(a) and 1(b), an electrolytic cell according to the present invention is illustrated. The cell is constructed of two mirror image box-shaped wall structures (1) and an ion exchange film (3) interposed between the box-shaped wall structures. The box-shaped structures (1) are formed of an electrical insulation material which exhibits high chemical resistance properties. Each box-shaped wall structure (1) has an open end and an interior framework (4) for holding the ion exchange film (3). The interior surface area (2) of the box-shaped wall structures (1) including the framework (4) is coated with metal.

The framework (4) projects from an interior surface of the box-shaped wall structures (1) and is formed of a plurality of intersecting horizontal and vertical members which divide the interior space of the box-shaped wall structures into a series of rectangular spaces. Notches (5) are formed in the horizontal and vertical members. The notches (5) are formed in a central portion of an edge of each interior wall forming the rectangular spaces which are formed by the horizontal and vertical members. Each box-shaped wall structure also includes an electrode (7), a gas outlet port (6) provided in an upper portion of the box-shaped wall structure (1), and an electrolyte circulation port (11) provided in a lower portion of the box-shaped wall structure (1).

In the assembled state, opposing box-shaped wall structures (1) of an electrolytic cell form a positive pole and a negative pole, respectively.

The ion exchange film (3) partitions the electrolytic cell into a negative chamber and a positive chamber. The film allows ions to move from the negative chamber to the positive chamber and prevents movement of an electrolyte and any resultant gas from migrating between the chambers. Therefore, the resulting structure prevents oxygen, hydrogen and the electrolyte from mixing.

In operation, the chambers of the electrolytic cell are charged, through ports (11), with an electrolyte formed of an aqueous potassium hydroxide solution or an aqueous sodium hydroxide solution.

When the positive and negative poles of a D.C. power supply are respectively connected to metal-coated surface (2) via the electrodes (7), the solution is electrolyzed. Oxygen gas is generated in a chamber (8) which is connected to the positive pole of the power supply. Similarly, hydrogen gas is generated in a chamber (9) which is connected to the negative pole of the power supply.

As discussed above, the oxygen gas generated in the oxygen chamber (8) is prevented from migrating into an adjacent chamber by the ion exchange film (3). Therefore, the generated oxygen is discharged from chamber (8) only by means of an oxygen discharge outlet (6a). Similarly, the ion exchange film (3) prevents hydrogen gas, generated in the hydrogen chamber (9), from migrating into the adjacent oxygen chamber (8). The generated hydrogen is discharged from the chamber (6a) only by means of a hydrogen discharge outlet (6b).

Figure 2:
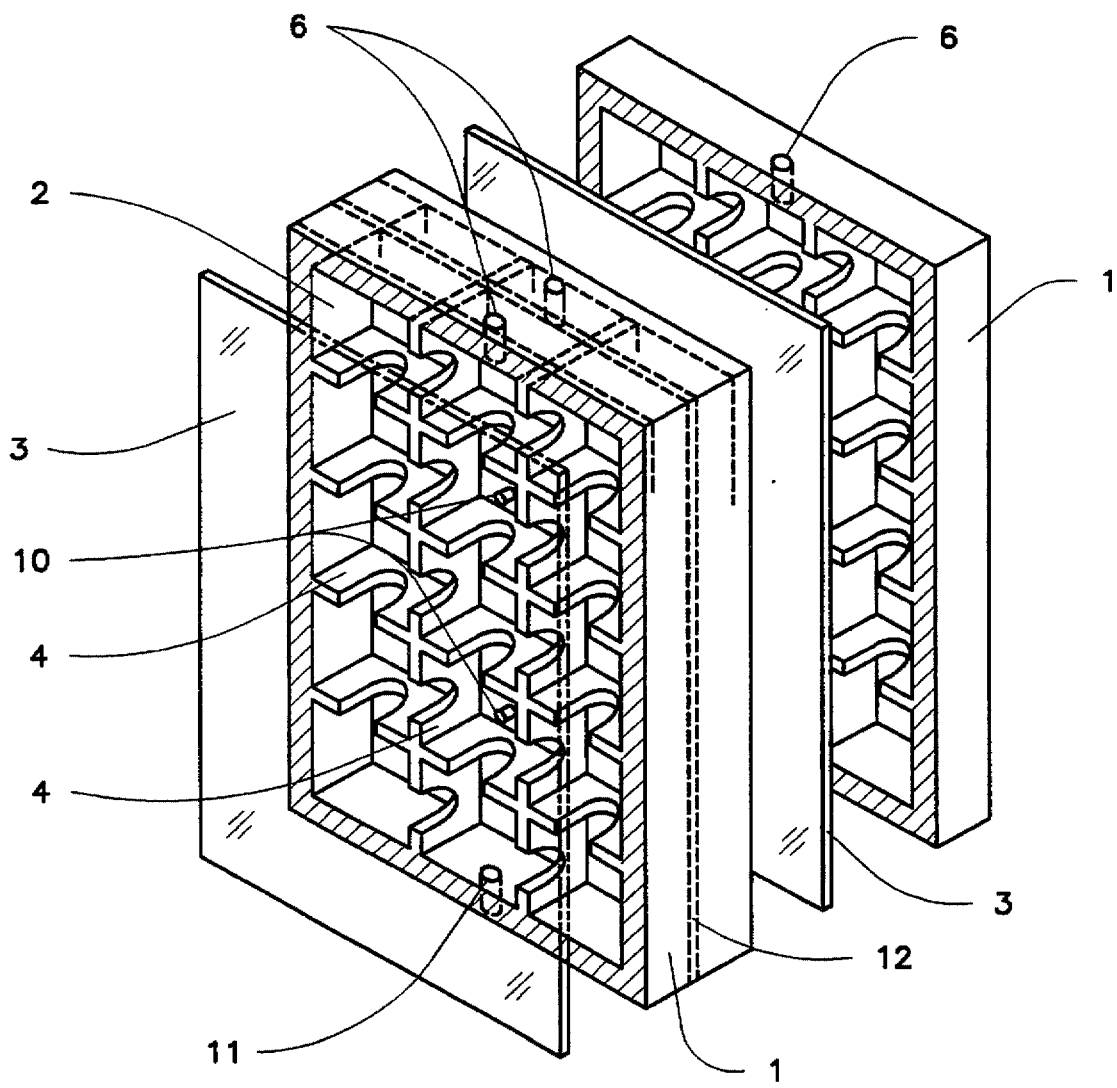
FIG. 2 is a partially exploded perspective view of an electrolytic cell unit which includes a plurality of the electrolytic cells shown in FIG. 1(a) and FIG. 1(b).

With respect to FIG. 2, an electrolytic cell unit is illustrated. The cell unit is formed of a plurality of the electrolytic cells shown in FIG. 1. In the unit shown in FIG. 2, two electrolytic cells are positioned back-to-back and have an integral connection (12). As in the cells shown in FIG. 1, the interior surface (2) of the box-shaped wall structures (1) are coated with metal. The metal-coated surfaces (2) are electrically short-circuited by electrical conductors (10) which are inserted through each of the back-to-back connections (12). The conductors (10) are formed of a material such as nickel, platinum or the like.

Figure 3:
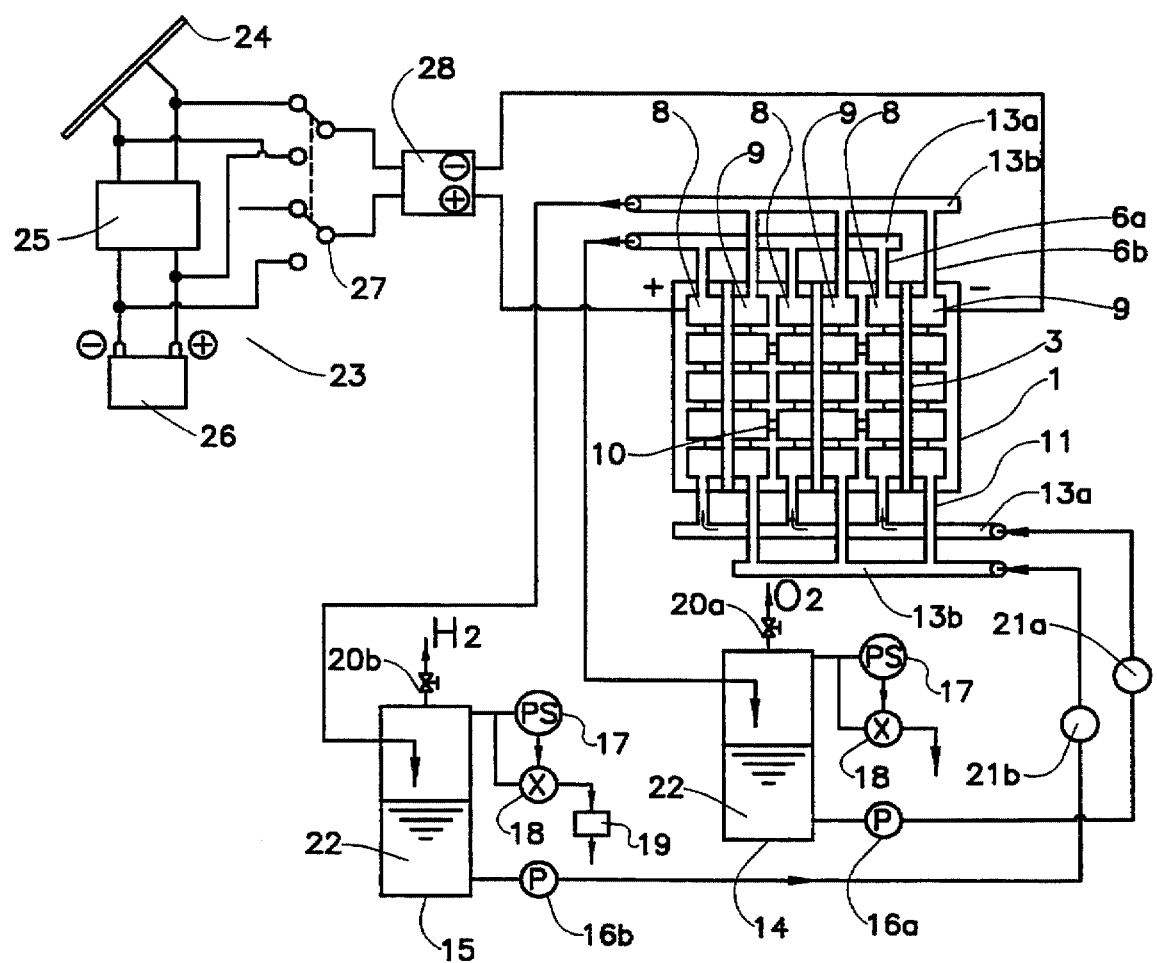
FIG. 3 is a schematic view of the oxygen-hydrogen electrolytic gas generation device incorporating a plurality of electrolytic cells connected in series.

As shown in FIG. 3, the plurality of oxygen chambers and hydrogen chambers are alternately juxtaposed to each other. In this manner, if a chamber at one end of the electrolytic cell unit is an oxygen chamber (8), the chamber at the opposite end will be a hydrogen chamber (9).

FIG. 3 is a schematic view of the overall oxygen-hydrogen gas generation apparatus for carrying out the process of separating the oxygen and hydrogen gases including gas-liquid separation tanks (14, 15). In the illustrated apparatus, an electrolytic cell unit is formed by a plurality of electrolytic cells connected in series.

Communication pipes (13a) are connected to the oxygen gas outlets (6a) in the upper portion of the electrolytic cell unit and to corresponding electrolyte circulation ports (11) in the lower portion of the electrolytic cell to form a closed circuit. Similarly, communication pipes (13b) are connected to the hydrogen gas outlets (6b) in the upper portion of the electrolytic cell and to corresponding electrolyte circulation ports (11) in the lower portion of the electrolytic cell to form a closed circuit.

The respective oxygen and hydrogen communication pipes (13a, 13b) form parallel closed fluid circuits which pass through respective gas-liquid separation tanks (14, 15) and respective circulation pumps (16a, 16b). The oxygen gas-liquid separation tank (14) and the hydrogen gas-liquid separation tank (15) are provided with respective discharge valves (20a, 20b). Also, each separation tank is provided with a safety device which includes a pressure switch (17) and a solenoid valve (18). The pressure switch (17) serves to actuate solenoid valve (18) to discharge gas from the tank when the internal tank pressure exceeds a predetermined value.

The hydrogen gas-liquid separation tank (15) is provided with an oxidation treatment unit (19) with is equipped with a catalyst (platinum-palladium) for oxidizing hydrogen gas which has been discharged from solenoid valve (18).

The oxygen gas-liquid separation tank (14) is provided with an electrolyte (22) which is fed through a cooler (21a) to the oxygen gas chambers (8) by means of the circulating pump (16a). Similarly, the hydrogen gas-liquid separation tank (15) is provided with an electrolyte (22) which is pumped by circulating pump (16b) through a cooler (21b) to the hydrogen gas chambers (9).

As discussed above, in operation, a positive D.C. voltage is connected to an electrode (7) inside the oxygen chambers (8) and a negative voltage is connected to an electrode (7) inside the hydrogen chamber (9). Electrolysis occurs when an electric current passes through the electrolyte with subsequent migration of positively and negatively charged ions to the negative and positive electrodes. Oxygen gas is generated in each of the oxygen gas chambers (8) which constitute the positive pole. Hydrogen gas is generated in each of the hydrogen gas chambers (9) which constitute the negative pole. The oxygen and hydrogen gases are respectively fed to the corresponding gas-liquid separation tanks (14, 15) along with the electrolyte (22). Each of the mixtures of electrolyte and gas are separated in the respective gas-liquid separation tank (14, 15).

The gas-liquid tanks (14, 15) are maintained at a constant pressure at all times. If the internal tank pressure rises above a safe level, discharge valves (18) open in response to the increased pressure and gas is exhausted to the outside until the over-pressure is relieved. Any hydrogen discharged through the solenoid valve (18) is subjected to an oxidation treatment in the oxidation unit (19).

Since the temperature of the electrolytes will increase due to the electrolysis process, the coolers (21a, 21b) are provided to lower the temperature of the electrolyte entering the electrolytic cells to a predetermined level.

Power can be supplied to the gas generation apparatus of the present invention from various sources. As shown in FIG. 3, it is possible to employ a power supply 23 which utilizes solar power. The power supply 23 includes a solar collector (24), a charge controller (25), and a storage battery (26). Normally, the current from the power supply (23) is fed from the solar battery (24) directly to each of the electrodes by means of a constant current circuit (28). However, when sunlight is not available, the current stored in the storage battery (26) is fed from the charge controller 25 to the electrodes (7).

The present invention, as described above provides the following advantages:

The ion exchange film (3) prevents oxygen and hydrogen from mixing in the electrolytic cell thereby enhancing the safety of the apparatus. Also, the entire electrolytic cell is of a simple construction because each of the box-shaped wall structures (1) serves as both a partition and an electrode due to the internal metal coating (2).

The quantity of oxygen or hydrogen gas can be regulated by connecting a plurality of electrolytic cells in series to form a electrolytic cell unit. The resulting unit is compact because the intermediate partitions (12) are formed by connecting two cells back-to-back.

Also, the generated gases, along with the respective electrolytes, are fed through parallel closed fluid circuits which include the gas chambers and the separation tanks. Hence, there is no need to uniformly regulate the pressure of the oxygen and hydrogen gases in their respective tanks since the pressure in the tanks can be independently controlled.

Accidents can be prevented with the present invention because the pressure in each of the separation tanks is maintained at a constant pressure by means of a pressure switch and a solenoid valve. Also, any discharged hydrogen gas is oxidized by a catalyst in order to prevent accidents such as combustion of the gas resulting in an explosion or a fire.

The framework (4) forms an irregular internal surface in the box-like wall structures (1), thereby increasing the internal surface area of each gas chamber. The interior surface is coated with metal to constitute the electrode and lower the electrical resistance thereof. Accordingly, it is possible to lower the voltage between the positive and negative electrodes, thereby improving the electrolytic efficiency of the electrolysis operation.

Further, by using solar power as the power source, energy savings are possible and the gas generation apparatus can be used in locations which are remote from other sources of electricity.

Although the invention has been fully described by way of examples with reference to the accompanying drawings, various changes and modifications will be apparent to those skilled in the art. Therefore, unless such changes and modifications otherwise depart from the spirit and scope of the present invention, they should be construed as being encompassed by the following appended claims.

What is claimed is:

1. An electrolytic cell for generating oxygen and hydrogen, said electrolytic cell comprising:
   an ion exchange film;
   a pair of wall structures each having an internal framework, wherein said ion exchange film is interposed between said wall structures and is supported by said internal framework to form a first gas chamber on one side of said ion exchange film and a second gas chamber on the other side of said ion exchange film;
   an electrode connected to each said wall structure;
   a metal coating provided on internal surface areas defined by interior surfaces of said wall structures including said internal framework;
   a discharge port provided in each of said wall structures; and
   an inlet port provided in each of said wall structures.

2. The electrolytic cell as claimed in claim 1, wherein each of said wall structures further comprise an upper portion and a lower portion, and said discharge port is located in said upper portion and said inlet port is located in said lower portion.

3. The electrolytic cell as claimed in claim 1, wherein said wall structures are mirror images of each other.

4. The electrolytic cell as claimed in claim 3, wherein said wall structures are in the shape of a parallelepiped having an open end.

5. An electrolytic cell unit including at least one electrolytic cell for generating oxygen and hydrogen, said at least one electrolytic cell comprising:
   an ion exchange film;
   a pair of wall structures each having an internal framework, wherein said ion exchange film is interposed between said wall structures and is supported by said internal framework to form a first gas chamber on one side of said ion exchange film and a second gas chamber on the other side of said ion exchange film;
   an electrode connected to each said wall structure;
   a metal coating provided on internal surface areas defined by interior surfaces of said wall structures including said internal framework;
   a discharge port provided in each wall structure of said pair of wall structures; and
   an inlet port provided in each wall structure of said pair of wall structures.

6. The electrolytic cell unit as claimed in claim 5, wherein said wall structures of said pair of wall structures are mirror images of each other.

7. The electrolytic cell unit as claimed in claim 5, wherein each wall structure of said pair of wall structures further comprises an upper portion and a lower portion and said discharge port is located in said upper portion and said inlet port is located in said lower portion.

8. The electrolytic cell as claimed in claim 5, wherein each wall structure of said pair of wall structures is in the shape of a parallelepiped having an open end.

9. The electrolytic cell unit as claimed in claim 5, wherein said at least one electrolytic cell comprises a plurality of electrolytic cells, and said plurality of electrolytic cells are positioned adjacent each other such that adjacent wall structures are integrally connected, and an electrical conductor is inserted through said integral connection to short circuit the respective metal-coated surfaces of said wall structures.

10. The electrolytic cell unit as claimed in claim 9, wherein said first and second gas chambers are alternately juxtaposed.

11. The electrolytic cell unit as claimed in claim 10, further comprising:
   a first conduit communicating with each of said first gas chambers via said discharge ports and said inlet ports; and
   a second conduit communicating with each of said second gas chambers via said discharge ports and said inlet ports,
wherein said plurality of first gas chambers are connected in series by said first conduit and said plurality of second gas chambers are connected in series by said second conduit.

12. An oxygen-hydrogen gas generation apparatus comprising an electrolytic cell unit having a plurality of electrolytic cells, each said cell comprising:
   an ion exchange film,
   a pair of wall structures each having an internal framework, wherein said ion exchange film is interposed between said wall structures and is supported by said internal framework to form an oxygen chamber on one side of said ion exchange film and a hydrogen chamber on the other side of said ion exchange film,
   an electrode connected to each wall structure,
   a metal coating provided on internal surface areas defined by interior surfaces of said wall structures including said internal framework,
   a gas discharge port provided in each of said wall structures; and an electrolyte inlet port provided in each of said wall structures, wherein said plurality of electrolytic cells are positioned adjacent each other such that adjacent cells are integrally connected, and an electrical conductor is inserted through said integrally connected portions to short circuit the respective metal-coated surfaces of said wall structures;

a first conduit fluidly communicating with each of said oxygen chambers at said discharge ports and said inlet ports;

a second conduit fluidly communicating with each of said hydrogen chambers at said discharge ports and said inlet ports;

an oxygen gas-liquid separation tank connected in fluid communication with said first conduit, wherein said first conduit forms a first closed fluid circuit which includes said oxygen gas-liquid separation tank; and a hydrogen gas-liquid separation tank connected in fluid communication with said second conduit, wherein said second conduit forms a second closed fluid circuit which includes said hydrogen gas-liquid separation tank.

13. The oxygen-hydrogen gas generation apparatus as claimed in claim 12, wherein said wall structures of each said pair of wall structures are mirror images of each other.

14. The electrolytic cell as claimed in claim 12, wherein said wall structures are in the shape of a parallelepiped having an open end.

15. The oxygen-hydrogen gas generation apparatus as claimed in claim 12, wherein said interior surface of each of said wall structures, including said framework, is coated with metal and forms a positive electrode in said oxygen chamber and a negative electrode in said hydrogen chamber.

16. The oxygen-hydrogen gas generation apparatus as claimed in claim 12, further comprising a power supply operably connected to said electrolytic cell unit, said power supply including a solar powered device having a storage battery.

17. The oxygen-hydrogen gas generation apparatus as claimed in claim 12, further comprising:

a first circulation pump connected in fluid communication in said first closed fluid circuit; and a second circulation pump connected in fluid communication in said second closed fluid circuit.

18. The oxygen-hydrogen gas generation apparatus as claimed in claim 17, further comprising:

a gas discharge valve mounted on each of said gas-liquid separation tanks;

a solenoid valve having an outlet and connected to each of said gas-liquid separation tanks; and a pressure switch operably connected to each of said gas-liquid separation tanks and said solenoid valve.

19. The oxygen-hydrogen gas generation apparatus as claimed in claim 18, further comprising an oxidation treatment unit connected to said outlet of said hydrogen solenoid valve.

* * * * *